United States Patent [19]
Todd

[11] Patent Number: 5,465,081
[45] Date of Patent: Nov. 7, 1995

[54] MULTICOMPONENT WIRELESS SYSTEM WITH PERIODIC SHUTDOWN OF TRANSMITTING AND RECEIVING MODES

[75] Inventor: Robert E. Todd, Blythe, Great Britain

[73] Assignee: Cedar-Dell Limited, Hexham, Great Britain

[21] Appl. No.: 934,442

[22] PCT Filed: Mar. 4, 1991

[86] PCT No.: PCT/GB91/00323

§ 371 Date: Oct. 6, 1992

§ 102(e) Date: Oct. 6, 1992

[87] PCT Pub. No.: WO91/14244

PCT Pub. Date: Sep. 19, 1991

[30] Foreign Application Priority Data

| Mar. 3, 1990 | [GB] | United Kingdom | 9004828 |
| Oct. 18, 1990 | [GB] | United Kingdom | 9022698 |
| Nov. 1, 1990 | [GB] | United Kingdom | 9023736 |

[51] Int. Cl.⁶ .................. H04Q 3/00; H04J 3/00
[52] U.S. Cl. .................. 340/825.05; 340/825.5; 340/825.44; 370/85.15
[58] Field of Search .......... 340/825.05, 825.5, 340/825.44; 370/85.15, 85.14, 58.1, 58.2; 455/10, 343

[56] References Cited

U.S. PATENT DOCUMENTS

| 4,535,449 | 8/1985 | Arragon | 370/85.15 |
| 4,580,266 | 4/1986 | Kletzkine et al. | 340/825.5 |
| 4,633,246 | 12/1986 | Jones et al. | 340/825.05 |
| 4,638,453 | 12/1986 | Gran et al. | 395/200 |
| 4,763,254 | 8/1988 | Mori et al. | 340/825.05 |
| 4,791,629 | 12/1988 | Burns et al. | 370/85.2 |
| 4,792,946 | 12/1988 | Mayo | 370/85.15 |
| 4,872,205 | 10/1989 | Smith | 340/825.5 |
| 5,049,875 | 9/1991 | DeLuca et al. | 340/825.44 |
| 5,168,271 | 12/1992 | Hoff | 455/343 |

FOREIGN PATENT DOCUMENTS

| 22198 | 7/1987 | European Pat. Off. |
| 2746283 | 4/1979 | Germany |
| 8809104 | 11/1988 | WIPO |

*Primary Examiner*—Thomas G. Black
*Assistant Examiner*—David Yiuk Jung
*Attorney, Agent, or Firm*—Madson & Metcalf

[57] ABSTRACT

A communications system comprises a plurality of transceivers capable of transmitting and receiving data from other transceivers in the system. At least one transceiver functions as a control module. Communication between the control module and the remainder of the communications modules occurs by consecutive communication between individual communications modules in the system. This means that low power transceivers can be used to form a system having a long range capability.

18 Claims, 2 Drawing Sheets

MULTICOMPONENT WIRELESS SYSTEM WITH PERIODIC SHUTDOWN OF TRANSMITTING AND RECEIVING MODES

BACKGROUND AND OBJECTS OF THE INVENTION

This invention relates to a communications system comprising a plurality of communications modules and at least one control module, in which each station is in communicating contact with the controller either directly or indirectly. Communications systems of this type may be used to form a number of different types of systems for example: a security system for buildings, motor vehicles or the like: a security system for ensuring that data which is transmitted within a data transmission system is secure from external influences: a system for allowing data from cash tills in a supermarket to communicate with a central stock control unit, etc.

Known communication systems of this type comprise a control module, and a plurality of communications modules spaced apart from the control module and from one another. If the communications system is being used as a security system for a building, for example, each communications module will be positioned at vulnerable parts of the building, for example at window latches and door locks. The control module may be positioned at any convenient position. In such a known communications system, the control module communicates directly with each station in turn, and there is no communication possible between neighbouring stations.

A problem with this known communication system is that the power of the control module must be sufficient to allow transmission between the control module and the most distant of the communications modules. For many applications it is necessary to have at least some of the communications modules positioned a long distance from the control module. This results in the control module having to have a high power which adds to the cost of the system, and also results in the system having to fulfill certain licencing requirements. High power systems have to pass stringent design and manufacturing standards, the user has to purchase a licence periodically, and in certain cases has to pass a test on its proper use. The licence is relatively expensive, the reason is that, if your system interferes with one other user per square mile, then the greater the range, (the higher the power) the greater the amount amount of interference you may cause. Also the greater the range you wish to receive over, the greater are your chances of being interfered with by other users. Doubling the range gives rise to an eight fold increase in the likelihood of interference. In addition as unnecessarily high power demand will be required which often cannot be conveniently supported by batteries even when it can be supported by batteries, the modules have either a very short useful life, or are very large (and expensive) and detract from the benefits of using "free standing" RF modules by being unnecessarily cumbersome.

Another problem associated with known communications systems, is that it is relatively east for an intervener to listen to the messages sent by the control module to a particular communications module, and then to disable the particular module by substituting a substitute module in the place of the original module. This enable someone trying to penetrate the system to disable a particular module, and gain access to the system. For example, if the system, is being used as a building security system, by disabling a particular module, access to the building at that point may be gained. If the substitute station is capable of transmitting and receiving exactly as the original station, the control module will not detect that anything is wrong.

Another problem in known communications systems is that a communications module which has received data from a second communications module is required to send a message to the transmitting module on receipt of the data, to confirm that the data has been received. This reduces the inherent speed of the system.

SUMMARY OF THE INVENTION

According to a first aspect of the invention there is provided a communications system comprising a control module, and a plurality of communications modules spaced apart from one another and from the control module, characterised in that each module comprises a short range tranceiver capable of transmitting data to and receiving data from another module in the system, and that in use the control module communicates directly with at least one but not all of the communications modules, the communication between the control module and the remainder of the communications modules occurring by consecutive communication between individual communications modules in the system.

In the system according to the first aspect of the invention, therefore, the control module transmits data to a first communications module, which first communications module acts on the data if appropriate, and then transmits data to a second communications module. This procedure is repeated in order that all communication modules receive a message from another communications module. The sequential communications can be directed at a particular module. This is preferred so that each module responds in the same order every time thus eliminating the possibility of a plurality of modules communicating simultaneously. This maintains the integrity of the link.

The communications modules will generally be arranged cyclically to form a loop, and data may be transmitted in either direction around the loop. Although each module may receive data once in a complete cycle, individual modules may also receive data more than once before every module has received data messages. However an individual module will only perform an actual role in the loop if it has detected a transmission which has been properly addressed to itself.

An advantage of the system according to the first aspect of the invention is that because the control module is not required to communicate with all of the communications modules directly, the system can be set up such that the control module does not have to transmit directly with a communications module positioned a long distance from the control module. This means that, although the communications system as a whole may cover a large distance, the control module has to transmit over a short distance only, for example, the distance between the control module and the nearest communications module. Once a communications module has received a message from the control module, that module can communicate with a neighbouring communications module directly which is positioned relatively near to that communications module. The modules in the system may be arranged such that, for example, no module is required to transmit or receive over a distance of greater than, say 30 m, although the system as a whole may extend over a much greater distance, This allows long distance transmission to be achieved using low power modules, and results in a low power system which is exempt from licencing requirements. It also provides a wire-free compact battery supported link.

Preferably data received by a module is modified by the module before being transmitted to the next module in the sequence, and the data transmitted to the next module controls the output of the next module. Thus the data received by a module will have been modified by the preceding module which transmitted the data. This means that a particular communications module will rarely, if ever receive the same message, which cuts down the possibility that someone will be able to interfere with the system, as it is virtually impossible to predict the data sequence which a particular communications module will receive. In addition, the actual data transmitted determines the output of a communications module receiving the message. This adds to the apparent randomness of the messages being sent and received in the system.

Advantageously, a first module which transmits to a second module can detect when the second module transmits to a third module. Once the first module detects that the second module has transmitted a signal, it knows that the second module has received the message it transmitted to it. Thus a module which has transmitted a signal does not have to receive a check signal back from the module receiving the data in order to ascertain whether the message has been received. This results in a system in which data can be transmitted at a high speed.

Preferably, each module is a tranceiver which operates in the radio frequency (RF) band, although other frequency ranges such as ultrasonic, microwave, or optical may also be used.

The system may operate exclusively at a single frequency, but preferably, it operates on any frequency within a range of frequencies, the operating frequency changing during the operation of the system. By arranging for the system to operate at any of a variety of frequencies within a range, the security of the system is further enhanced. Such frequency change may be effected using spread spectrum technology. In such systems the preceding message received by the module will have contained data, advising it as to which would be the next frequency at which to look for the next transmission. This further enhances the technology currently employed in spread spectrum technology.

Preferably, each module knows the identity of the system and its own address. This means that if an intervener attempts to introduce a substitute or additional module into the system, that substitution or addition will be detectable by the system. This further adds to the security of the system.

Preferably, also, each module knows when within a given time slot it should transmit and receive data, and the module shuts down until it is time for it to receive a signal. That is, it goes into a state which gives minimal power consumption such that it is extremely hard to measure the very small amount of power which is consumed. This is simply to take advantage of the low power transmission requirements and to make the system compatible with long life, even when supported by a small battery. The only part of the system which doesn't change is the RF Oscillator 21. This is the key which is used to keep the whole system functioning in unison, the comparison being "Synchronised watches". This allows unrelated modules to meet up together at a pre-arranged time. The oscillator is effectively the systems "Watch". Everything else is simply ready and waiting, but actually doing nothing, to conserve power. At this time, it activates itself ready to receive a data. This reduces the power requirement of the system.

Advantageously, just before transmitting data, a module will switch into the receive mode to check whether the airwaves are clear. If they are not clear, the module will not transmit. Thus if an intervener is attempting to "jam" the system this will be detected by a module about to transmit, which module will not then transmit. The control module will thus be alerted to the existence of a problem, and may activate an alarm.

Although a communications module carries out different functions to the control module, it may be physically identical to the control module, but distinguished from it by software controlling the module. In some circumstances each of the communications modules could be control modules if absolute transmission integrity is required. The software associated with a control module performs certain checking and verification functions at the same time as passing on data it has received.

BRIEF DESCRIPTION OF THE DRAWINGS

The invention will now be described by way of example only with reference to the accompanying drawings in which.

DETAILED DESCRIPTION OF THE EMBODIMENTS

Figure 1:
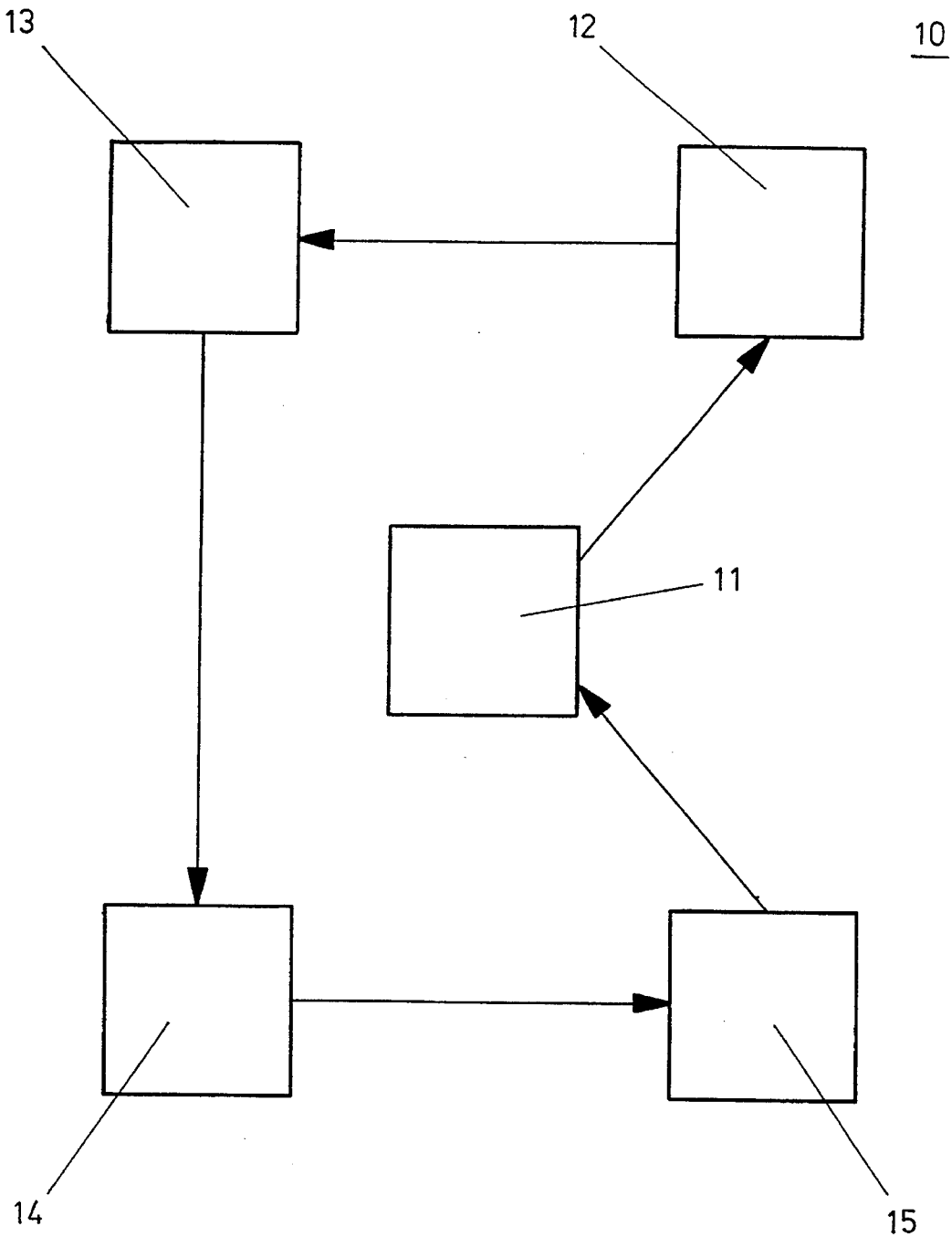
FIG. 1 is a block diagram of a system according to the invention.

Referring to FIG. 1, a system according to the present invention and operating in the RF band is designated generally by the reference numeral 10. The system 10 comprises a control module 11 and communications modules 12, 13, 14, 15. The control module 11 and communications modules 12–15 are physically identical, but are controlled by different software shown in more detail in FIG. 2.

The control module 11 transmits data to a particular communications module, for example module 12. This module 12 then transmits to another communications module 13, and so on, until all modules 12–15 have received data. The control module 11 does not, therefore, communicate directly with each of the modules 11–15.

Figure 2:
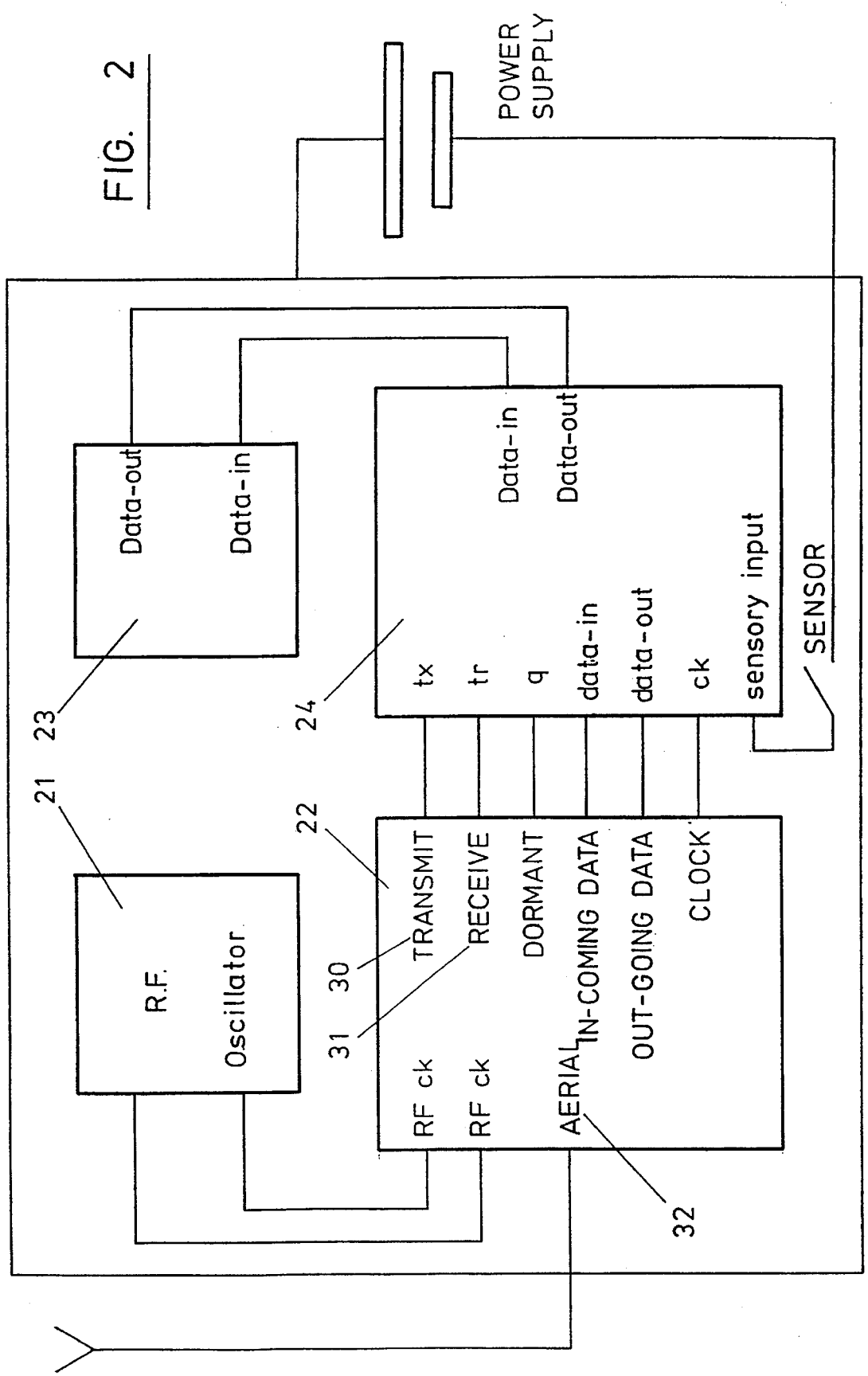
FIG. 2 is a block diagram of a module of the system of FIG. 1.

Referring to FIG. 2, a module 11–15 is shown in more detail and comprises an RF oscillator 21, an RF chip 22, a memory 23 and a logic chip 24.

The operation of the system 10 will now be described. Initially, when the system 10 is first installed it must be placed into the Install mode to set up the system. This is achieved by connecting each module in turn to a power supply, for example a battery, starting with the control module. Once this has been carried out, the control module 11 will have been through a "Boot-Up" routine, and the control 11 will have achieved the following:

1. It will have taught the communications modules the identity of the system or loop they are part of;

2. It will have taught each communications module where it is in the loop;

3. It will have taught each communications module which zone it has been allocated to. If any modules are in the same zone, they will be able to receive the same data, for example:

| Module | Receive | Transmit | Message Read |
|---|---|---|---|
| 12 | None | Hello 15 | None |
| 13 | 12 says Hello 15 | I am 13. | |
| | | 12 says Hello 15 | 12 says Hello 15 |
| 14 | I am 13. | I am 14. | |
| | 12 says Hello 15 | 12 says Hello 15 | None |
| 15 | I am 14. | I am 15. | |
| | 12 says Hello 15 | Hello 12 | Hello 15 |

This example shows how 13 reads the message that is intended for 15 because it is in the same "zone". This allows units in the same zone to be aware of the actions of each other unit in its own zone.

4. It will have taught each communications module how to generate the codes required within the loop;

5. It will have learned how many communications modules it has in its loop.

6. It will know the message structure of the last communications module, and from this it knows when to close the loop.

7. It knows that if it receives the correct message structure at the wrong time, that there is an attempt to defeat the system.

8. It will know what the retry codes will be from each communications module, and thus can advise the installer if a particular unit has missed its slot at the first transmission attempt and may be unreliable in practice.

Each module 11–15 comprises a radio transmitter 30, a radio receiver 31 and a logic chip 24 for controlling the data.

The logic chip 24 controls the module it is associated with and can reduce power consumption when the module is in the receiving mode. The logic chip is software driven to improve its versatility. The software control can be taught to any module via the system 10. This enables the system to be updated remotely, thus drastically reducing up-dating costs and improving the systems inherent flexibility.

The RF chip 22 (in the receive mode) recives the Incoming data from the aeriel 32. This is in the form of a "Carrier Wave" with a "Modulation" (variation from the true centre frequency in one of many forms, eg:- Frequency Modulation (FM), Amplitude Modulation (AM) and others). The RF Chip 22 "De-Modulates" this to remove the carrier frequency. It is then able to send out to the Logic Chip 24 the actual data that was transmitted in the first place.

Conversely it receives the data from the Logic Chip 24, it then "Modulates" it (combines it to the carrier frequency, then sends out the product of this to the aerial 32 for conversion to radio waves.

The memory 23 serves to remember the peculiarities of the module it is part of, this allows it to look for and de-code messages which are intended for it, whilst ignoring other messages which do not concern to it, an example would be:

Four communicating modules 12, 13, 14 and 15 are linked by the system 10. Module 12 wants to talk to module 15 without modules 13 and 14 hearing the conversation, but modules 12 and 15 are too far apart for this to be done on a low level transmission. Module 12 therefore says "Hello 15". Module 13 sees this message, but doesn't de-code it because it isn't 15, but re-transmits it on by saying "I am 13, 12 says Hello 15", 14 knows that any message from 13 should be picked up, so it does. It sees that although the transmission is directed at it, the content of the transmission is not addressed to it, so it knows that 12 said "Hello 15". It also knows that 13 detected it and passed it on, so it knows that 13 is OK. It can therefore say "I am 14, the loop up to my position is intact, 12 says Hello 15". 15 receives this, it knows that the message is directed towards it, so it relays the message "12 says Hello 15" to its logic control. At the same time it has verified that all of the sub-units are functioning correctly and that the loop is OK. Eg:

| Module | Receive | Transmit | Message Read |
|---|---|---|---|
| 12 | None | Hello 15 | None |
| 13 | 12 says Hello 15 | I am 13. | |
| | | 12 says Hello 15 | None |
| 14 | I am 13. | I am 14. | |
| | 12 says Hello 15 | 12 says Hello 15 | None |
| 15 | I am 14. | I am 15. | |
| | 12 says Hello 15 | Hello 12 | Hello 15 |

Control Module II

1. Wake-up and "Sniff Air-waves". By sniffing the air-waves the control module can check whether it is safe to transmit.

2. If clear to transmit go to 4, if not repeat "n" times, transmit when clear air-waves and timing windows coincide. If this does not occur go to 3.

3. Store "n"th Fail". If not yet at pre-set level of failed attempts. Restart at 1 when next timing window occurs. If the number of aborted transmissions is at preset level go to 7.

4. Transmit out code "Packet"

5. Return to receive mode, listen for the next unit transmitting on into the loop. This enables module 11 to check that the message has been correctly received.

6. If seen go to sleep then wake up for the next full system poll and start at 1. If not seen go to 1 now until predetermined number of attempts have been made, once this occurs go to 7.

7. Trigger alarm and then go to 1

Communications modules 12–15

1. When signalled by the logic chip 24 which has an integral timer, that a transmission is about to be sent, wake up and "Sniff" the Air-Waves.

2. If clear go to 4, if not, further timing pulses will be received from the logic chip to allow time subsequent transmissions to be detected.

3. If the number of attempted transmissions is below a pre-set level go to 1, if it has reached the "n"th attempt, the logic chip will register a break-down of the loop. Then go to 1.

4. Sample the in-coming data string (message) and decode it checking the functions of the error detection and correction to verify the message as valid. The message may contain an instruction for this module to action, it may simply be checking that everything is well, in either event the logic chip will action whatever it has to, then it will compile its own message, to be sent to its own number plus 1 (ie the next communications module in the loop), complete with its new error detection and correction codes.

5. The logic chip 24, will then instruct the communications module to go into the transmit mode, it will then pass the data through to the transmitter.

6. Once it has transmitted its message, the logic chip 24 will instruct it to revert to the receive mode, it will then listen to hear the next unit transmit out to the next slave module in the system 10.

7. If it hears a message that it can determine as from the next module (it knows the next module's address code) then it will know that the loop is complete to the next stage and will shut down. If it doesn't hear a correct message, go to 5, until "n" attempts have been made, once this point has been reached it will be instructed by the logic chip to transmit out a system alarm message, instead of any other message it may wish to transmit.

The data flow within a module is as follows:

1. The RF oscillator which acts as an on-board timer places the module in the Receive mode because it is expecting to receive a transmission from a preceding module.

2. The Receiver "Wakes up" and "Samples the Air-waves" to make sure that they are free from other transmissions.

3. i. If the Air-waves are clear it awaits the transmission.

ii. If the Air-waves are busy it will ignore the transmissions it sees until the time it would expect the preceding unit to attempt a re-try of the transmission.

iii. 3ii will occur a pre-determined number of times until it either receives a valid transmission through "Clear Air" or else it is instructed by its associated logic to "Shut down" and abort the attempt to receive a valid transmission.

4. As soon as it receives a transmission, the Logic chip 24 will inspect it to confirm its validity in-so-far as the receiving unit is concerned.

5. Incorporated in this embodiment of the system is "String of data" whose role is to detect errors in the transmission.

6.i. Subject to the incoming data's content and the result of the "Error Checking" string, the Logic chip may decide to correct the errors and not abort the sequence, this is accomplished by another data string which follows the error detection string and are both carried within the original "Message". These functions are of known technology, and involve simple binary mathematics.

ii. The Logic chip 24 may determine that the errors detected fall outside of the parameters,it has been programmed to accept, if this is the case, it will abort the sequence and continue from 3.i.

7.i. If the received message is accepted there may be an instruction embedded within the message structure, which the receiving module may have to action, if so it will do whatever it has to do, or remember what it has to do, then modify the message, add on the error detection and correction codes which it generates mathematically in accordance with the contents of the message it is about to transmit onwards through the loop. It will then transmit on the new message.

ii. If there is no action to perform it will simply "Re-address" the message to the next unit in the sequence, then transmit it out with the associated (modified) error detection and correction strings.

8. After it has transmitted the message it will wait a predetermined length of time, if the next unit in the sequence transmits the message on it will know that its transmission was sucessfully received. If not it will retransmit the same message and wait again. This can be repeated a pro-determined number of times before the module determines that the transmission has failed and it will abort the attempt.

9. If it has stored a command which would have taken too long to perform, and thus would have destroyed the synchronicity of the system as a whole, it will execute this now, noting whether it was completed successfully not, and storing this data for the next pass if needs be.

10. If it aborted the previous attempt it can generate a "Universal system code". This will be transmitted out the next time it wakes up, this message can follow "ANY" path back to the "Control module" thus eliminating the need for a subsequent unit to complete in the loop.

11. The message generated by 10, may advise the control module of the fault Transmission failure unit "My Number Plus 1", the control unit could then interrogate this specific unit with a "System check", in the event of this failing also, it can then by-pass the defective unit and interrogate all of the subsequent units. Thus in a security/safety application this scenario could give rise to an alarm/warning condition.

12. The system can allow the "Transmission Through the Loop" to be effected in either direction. This could be of further use in "High Security applications" where a higher overall awareness is required of any reporting system.

Example Message Structure

| Transmitter: | Receiver: |
| --- | --- |
| 1. Wake up next module | 1. synchronise clocks |
| 2. I am in loop number**** | 2. So am I |
| 3. I want to talk to**** | 3. That is my number I will listen |
| 4. This is your message | 4. I will action it |
| 5. Check the message | 5. The message checks out |
| 6. Correction sequence | 6. Sequence checks out |
| 7. Listen for next module to transmit | 7. Change to transmit mode |
| 8. Shut down | 8. Transmit code to next module |

When the receiver in this example, sends out its message, the transmitter in the example will be in the receive state, and when it sees the message being transmitted out, it knows that the receiver in this case has heard and responded to its command.

The message structure can be made as simple or as complex as desired to suit the application it is being put to. Part of the message can be used to check the operation of the various modules, effectively they can detect faults, or conditions likely to give rise to a fault, eg a low battery, it can then notify the user of an impending or existing problem, and "Identify" the specific module to which the data relates.

The R.F. link described hereinbefore has higher security than known links of this type. This level of security is similar to that obtained from a wired link. In addition it uses minimal power to maintain the link, and it can be used effectively over wide areas, even with low powered transmissions.

The communications modules 11–15 act sequentially as control modules, in that they modify the message received before sending it on to the subsequent module. When the system 10 is installed, a random string of data will be programmed into the control module 11. This string of data may determine the direction in which communication between modules occurs. The direction of data flow may change before all modules have received a message. However, the system ensures that all modules are transmitted to at least once in a given transmission sequence.

The fact that a module which is about to transmit will first of all switch to the receive mode for a short time to check that the airwaves are clear, ensures that no data will be transmitted if an attempt to sabotage the system is being made.

If any unit cannot transmit at its allocated time, it can listen to the transmission anyway. If it sees the message it should have transmitted out it knows it is being substituted as an attempt to defeat the system. It will then generate an alarm condition to be transmitted out at the next available time slot. If this is also covered it will cyclically repeat the code out of phase until it is detected by another module. This limits the time that such an event would go undetected to a very short period of time. A period somewhat less that a second would be typical.

We claim:

1. A communication system comprising a control module, and a plurality of communications modules spaced apart from one another and from the control module wherein each module comprises a short range transceiver capable of transmitting data to and receiving data from another module in the system, and where in use the control module communicates directly with at least one but not all of the communications modules, the communication between the control module and the remainder of the communications modules occurring by consecutive communication between individual communications modules in the system, wherein data received by a module is modified by the module before being transmitting to the next module in sequence, and wherein the data transmitted to the next module controls the output of the next module, wherein immediately before transmitting data, each communications module switches into the receive mode to check whether the airways are clear to avoid interference of transmissions, and wherein each module knows when within any given time slot the module should transmit and receive data such that the module shuts down transmitting and receiving modes at a predetermined time after transmission until it is time for the module to receive a signal.

2. A system according to claim 1 wherein the communications modules are arranged cyclically to form a loop, and data is transmittable in either direction around the loop.

3. A system according to claim 2 wherein each module after transmitting its signal to the next module in the sequence can detect when that next module transmits its signal.

4. A system according to claim 3 wherein at least one module remains in its receive mode for a predetermined period of time after transmitting its signal to the next module in the sequence, even if it fails to detect said next module transmitting its signal.

5. A system according to claim 4 wherein each module is a transceiver which operates in the radio frequency band.

6. A system according to claim 5 wherein each module knows the identity of the system and its own address.

7. A system according to claim 6 wherein each of the communications modules is physically identical to the control module, but distinguished from it by software controlling the communications module.

8. A system according to claim 7 wherein each of the communications modules is a control module.

9. A system according to claim 8 wherein each module will switch into the receive mode at a predetermined time to receive an expected signal from another one of the modules, and will remain in the receive mode in the absence of the expected signal.

10. A system according to claim 1 wherein each module is a transceiver which operates in the radio frequency band.

11. A system according to claim 1 which is operational on any predetermined frequency within a range of frequencies, and wherein the operating frequency changes during the operation of the system based upon transmitted data.

12. A system according to claim 11 wherein each module knows the identity of the system and its own address.

13. A system according to claim 1 wherein each module knows the identity of the system and its own address.

14. A system according to claim 1 wherein each of the communications modules is physically identical to the control module, but distinguished from it by software controlling the communications module.

15. A system according to claim 1 wherein each of the communications modules is a control module.

16. A system according to claim 1 wherein each module after transmitting its signal to the next module in the sequence can detect when that next module transmits its signal.

17. A system according to claim 1 wherein each module will switch into the receive mode at a predetermined time to receive an expected signal from another one of the modules, and will remain in the receive mode in the absence of the expected signal.

18. A system according to claim 1 wherein transmission of data between individual communication modules occurs along a variable path.

* * * * *